US010819217B2

(12) United States Patent
Ido et al.

(10) Patent No.: US 10,819,217 B2
(45) Date of Patent: Oct. 27, 2020

(54) POWER CONVERSION DEVICE AND COMMUNICATION METHOD

(71) Applicant: Mitsubishi Electric Corporation, Chiyoda-ku, Tokyo (JP)

(72) Inventors: Yasunori Ido, Tokyo (JP); Muneharu Tokunaga, Tokyo (JP); Hideaki Ohashi, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/483,529

(22) PCT Filed: Mar. 3, 2017

(86) PCT No.: PCT/JP2017/008497
§ 371 (c)(1),
(2) Date: Aug. 5, 2019

(87) PCT Pub. No.: WO2018/158935
PCT Pub. Date: Sep. 7, 2018

(65) Prior Publication Data
US 2020/0259411 A1      Aug. 13, 2020

(51) Int. Cl.
*H02M 1/32*          (2007.01)
*H02M 7/797*         (2006.01)
(Continued)

(52) U.S. Cl.
CPC .............. *H02M 1/32* (2013.01); *H02M 1/36* (2013.01); *H02M 7/797* (2013.01); *H02M 2001/0012* (2013.01)

(58) Field of Classification Search
CPC .......... H02M 1/32; H02M 1/36; H02M 7/217; H02M 7/219; H02M 7/797; H02M 2001/0012
See application file for complete search history.

(56) References Cited

U.S. PATENT DOCUMENTS 5,065,304 A * 11/1991 Tamai ............... H02M 7/53875
363/95
9,590,530 B2 * 3/2017 Geyer ................... H02M 7/537
(Continued)

FOREIGN PATENT DOCUMENTS

EP         2905889 A1      8/2015
JP         S58133067 A     8/1983
(Continued)

OTHER PUBLICATIONS

International Search Report (PCT/ISA/210) dated May 23, 2017, by the Japan Patent Office as the International Searching Authority for International Application No. PCT/JP2017/008497.
(Continued)

*Primary Examiner* — Yusef A Ahmed
(74) *Attorney, Agent, or Firm* — Buchanan Ingersoll & Rooney PC

(57) ABSTRACT

A power conversion device includes: power conversion circuitry including a plurality of submodules connected in series to each other; a protection device generating a protection command for protecting each submodule; and one or more relay devices outputting the protection command to each submodule. The relay device includes: a first communication circuit for communicating with the protection device; and a second communication circuit for communicating with the power conversion circuitry. The first communication circuit transmits the stop command to the second communication circuit through a first communication channel, and transmits different information different from the stop command to the second communication circuit through a second communication channel. The communication speed of communication through the first communication channel is higher than that of communication through the second communication channel.

11 Claims, 7 Drawing Sheets

(51) Int. Cl.
*H02M 1/36* (2007.01)
*H02M 1/00* (2006.01)

(56) References Cited

U.S. PATENT DOCUMENTS

| | | | |
|---|---|---|---|
| 10,205,402 B2* | 2/2019 | Fujii | H02M 7/48 |
| 10,560,014 B2* | 2/2020 | Chivite-Zabalza | H02J 3/36 |
| 2004/0202192 A9 | 10/2004 | Galbi et al. | |
| 2013/0147407 A1* | 6/2013 | Kawamura | G01K 3/04 |
| | | | 318/400.21 |
| 2015/0039949 A1* | 2/2015 | Brockerhoff | G06F 13/4282 |
| | | | 714/712 |
| 2016/0056727 A1* | 2/2016 | Mukunoki | H02M 7/04 |
| | | | 363/68 |
| 2016/0126880 A1* | 5/2016 | Choi | H02P 27/06 |
| | | | 318/503 |
| 2016/0329831 A1* | 11/2016 | Mukunoki | H02M 7/68 |
| 2016/0336874 A1* | 11/2016 | Kikuchi | H02M 7/483 |
| 2017/0047860 A1* | 2/2017 | Fujii | H02M 7/2173 |
| 2017/0214334 A1* | 7/2017 | Mukunoki | H02M 7/483 |
| 2018/0069488 A1* | 3/2018 | Mukunoki | H02M 7/48 |
| 2018/0159422 A1* | 6/2018 | Kikuchi | H02M 1/32 |
| 2018/0358887 A1* | 12/2018 | Jebenstreit | H02M 7/483 |
| 2018/0366943 A1* | 12/2018 | Matsuoka | H02H 7/1225 |
| 2019/0052086 A1* | 2/2019 | Kajiyama | H02M 5/458 |
| 2019/0238240 A1* | 8/2019 | Lin | H04B 17/102 |
| 2019/0386578 A1* | 12/2019 | Kajiyama | H02M 7/1557 |
| 2020/0083799 A1* | 3/2020 | Ishida | H02M 5/458 |
| 2020/0112172 A1* | 4/2020 | Yamanaka | H02M 7/48 |
| 2020/0136421 A1* | 4/2020 | Kim | H02J 7/025 |
| 2020/0136861 A1* | 4/2020 | Ogawa | H04L 49/552 |
| 2020/0161852 A1* | 5/2020 | Ishida | H02H 3/042 |

FOREIGN PATENT DOCUMENTS

| | | |
|---|---|---|
| JP | H03267843 A | 11/1991 |
| JP | H08032606 A | 2/1996 |
| JP | 2014207728 A | 10/2014 |
| JP | 2015130746 A | 7/2015 |

OTHER PUBLICATIONS

Written Opinion (PCT/ISA/237) dated May 23, 2017, by the Japan Patent Office as the International Searching Authority for International Application No. PCT/JP2017/008497.

Burlacu, Paul Dan, et al., "Synchronization of the distributed PWM carrier waves for Modular Mutilevel Converters", IEEE, 2014 (pp. 553-559).

Knezic, Mladen, et al., "Topology Aspects in EtherCAT Networks", IEEE, 2010 (pp. T1-1 to T1-6).

Extended European Search Report dated Jan. 31, 2020 for corresponding European patent application No. 17898750.9, 7 pages.

* cited by examiner

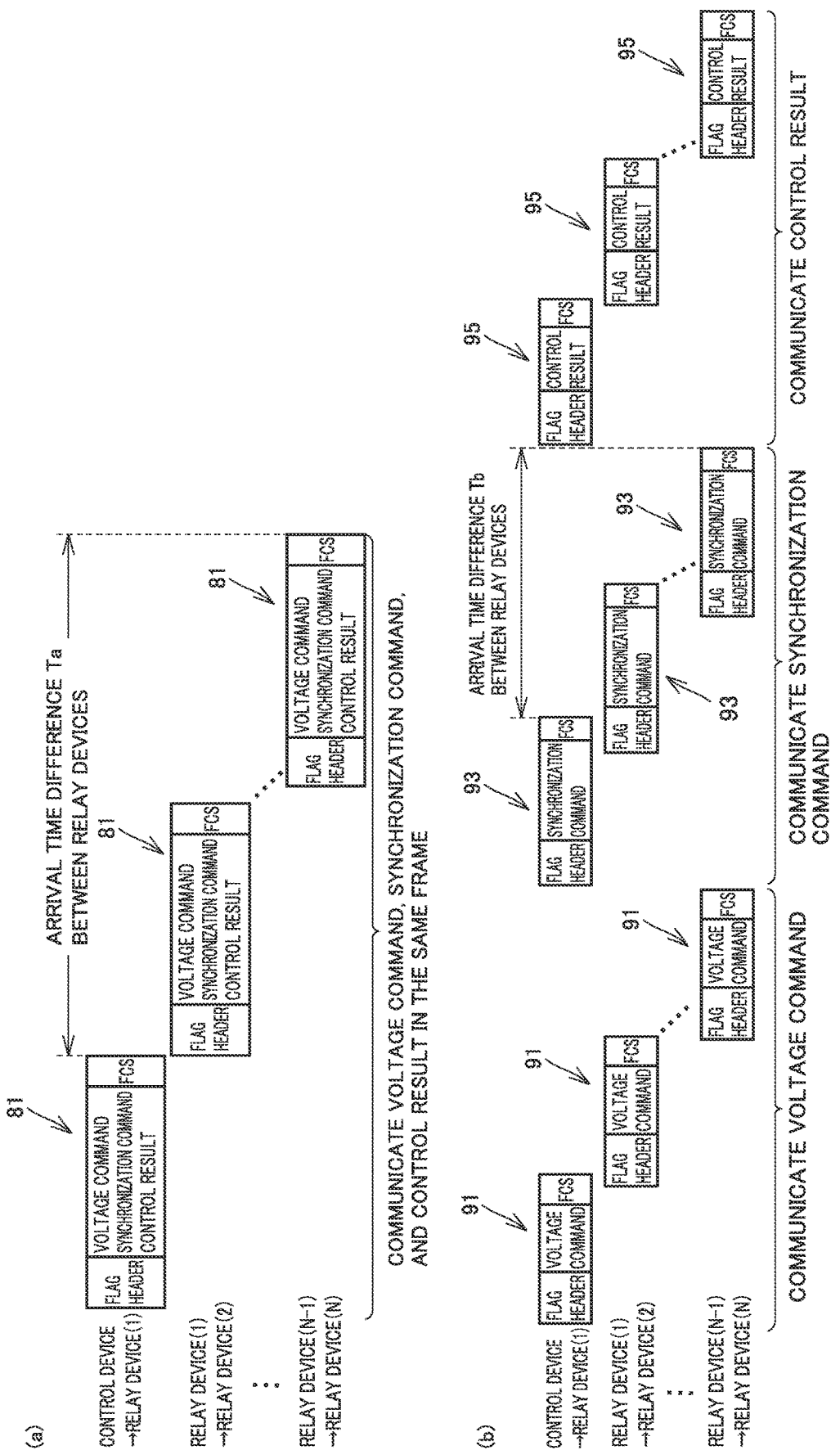

POWER CONVERSION DEVICE AND COMMUNICATION METHOD

TECHNICAL FIELD

The present disclosure relates to a power conversion device performing power conversion between AC and DC, and a communication method used for the power conversion device.

BACKGROUND ART

The Modular Multilevel Converter (MMC) is known as a large-capacity power conversion device connected to an electric power system. The Modular Multilevel Converter includes, for each phase of AC, an upper arm connected to a high-potential-side DC terminal and a lower arm connected to a low-potential-side DC terminal. Each arm is made up of a plurality of cascaded submodules.

For example, Japanese Patent Laying-Open No. 2015-130746 (PTL 1) discloses a power conversion device including a power conversion circuit capable of converting AC to DC or DC to AC. The power conversion circuit includes an arm made up of a plurality of series-connected unit converters. The power conversion circuit further includes a first control device collectively controlling each of the unit converters, a plurality of second control devices daisy-chained to the first control device, and a third control device connected to the second control device for controlling a corresponding unit converter.

CITATION LIST

Patent Literature

PTL 1: Japanese Patent Laying-Open No. 2015-130746

SUMMARY OF INVENTION

Technical Problem

When overcurrent flowing in any of the arms due to, for example, a fault in an electric power system is detected, it is necessary to transmit a stop command as immediately as possible to each submodule, for turning off a semiconductor switching device which is a component of the submodule, in order to prevent circuit failure. According to PTL 1, a central control device transmits, to each intermediate control device, a common command summarized into one type of communication frame, and each intermediate control device performs distributed control of each cell control device, so that the communication frame length is shortened to thereby reduce a communication transmission delay. PTL 1, however, does not teach a configuration for transmitting the stop command to each submodule as immediately as possible.

In an aspect, an object of the present disclosure is to provide a power conversion device capable of transmitting a stop command to each submodule as quickly as possible upon detecting overcurrent.

Solution to Problem

In accordance with an embodiment, a power conversion device performing power conversion between a DC circuit and an AC circuit is provided. The power conversion device includes: power conversion circuitry including a plurality of submodules connected in series to each other; a protection device configured to generate a protection command for protecting each of the submodules; and one or more relay devices configured to output the protection command to each of the submodules. The protection command includes a stop command for stopping operation of each of the submodules. The relay devices each include: a first communication circuit configured to communicate with the protection device; and a second communication circuit configured to communicate with the power conversion circuitry. The first communication circuit is configured to transmit the stop command to the second communication circuit through a first communication channel, and transmit different information different from the stop command to the second communication circuit through a second communication channel. A communication speed of communication between the first communication circuit and the second communication circuit through the first communication channel is higher than a communication speed of communication between the first communication circuit and the second communication circuit through the second communication channel.

In accordance with another embodiment, a power conversion device performing power conversion between a DC circuit and an AC circuit is provided. The power conversion device includes: power conversion circuitry including a plurality of submodules connected in series to each other; a control device configured to generate a control command for controlling operation of each of the submodules; and a plurality of relay devices configured to output the control command to each of the submodules. The control command includes a synchronization command for synchronizing respective operations of the submodules. The control device is connected to the plurality of relay devices through a ring-type network. The relay devices are each connected to a predetermined number of submodules among the plurality of submodules through a star-type network. The control device is configured to transmit, to the plurality of relay devices, a first communication frame containing a different command which is included in the control command besides the synchronization command, and a second communication frame containing the synchronization command which is included in the control command.

In accordance with still another embodiment, a communication method used for a power conversion device performing power conversion between a DC circuit and an AC circuit is provided. The power conversion device includes: power conversion circuitry including a plurality of submodules connected in series to each other; a protection device configured to generate a protection command for protecting each of the submodules; and one or more relay devices configured to output the protection command to each of the submodules. The protection command includes a stop command for stopping operation of each of the submodules. The relay devices each include: a first communication circuit configured to communicate with the protection device; and a second communication circuit configured to communicate with the power conversion circuitry. The communication method includes: transmitting, by the first communication circuit, the stop command to the second communication circuit through a first communication channel; and transmitting, by the first communication circuit, different information different from the stop command to the second communication circuit through a second communication channel. A communication speed of communication between the first communication circuit and the second communication circuit through the first communication channel is higher than a communication speed of communication between the first communication circuit and the second communication circuit through the second communication channel.

Advantageous Effects of Invention

According to the present disclosure, the stop command can be transmitted to each submodule as quickly as possible upon detecting overcurrent.

BRIEF DESCRIPTION OF DRAWINGS

FIG. 7 illustrates a communication method and advantages thereof according to Embodiment 2.

DESCRIPTION OF EMBODIMENTS

Figure 1:
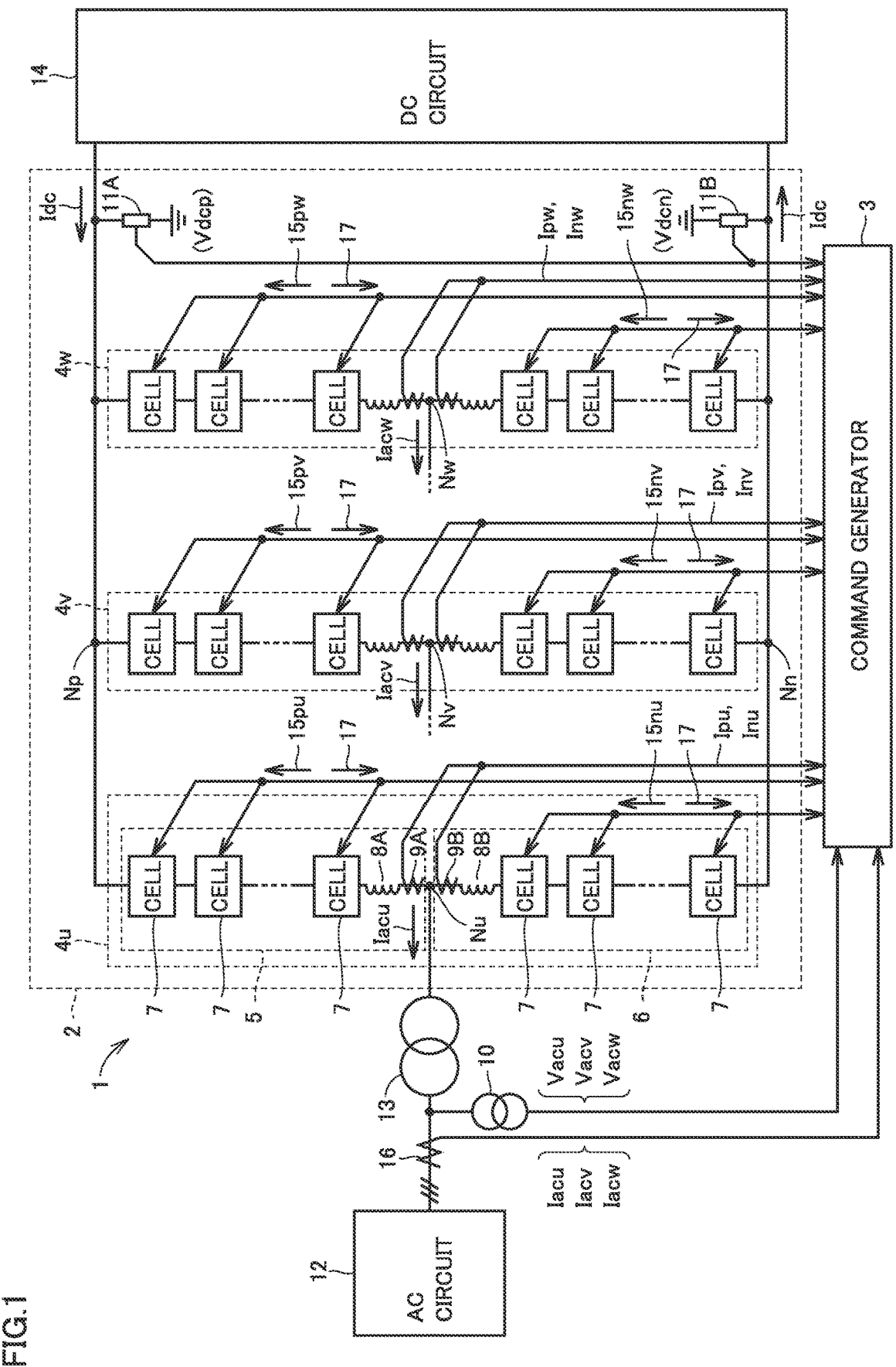
FIG. 1 is a schematic configuration diagram of a power conversion device according to Embodiment 1.

Embodiments of the present invention are described hereinafter with reference to the drawings. In the following description, the same parts are denoted by the same reference characters. They are named identically and function identically. A detailed description of them is therefore not repeated.

Embodiment 1

[Configuration of Power Conversion Device]

FIG. 1 is a schematic configuration diagram of a power conversion device according to Embodiment 1. Referring to FIG. 1, power conversion device 1 is configured in the form of a modular multilevel converter including a plurality of submodules (corresponding to "cells" in FIG. 1) connected in series to each other. "Submodule" is also called "converter cell." Power conversion device 1 performs power conversion between a DC circuit 14 and an AC circuit 12. Specifically, power conversion device 1 includes power conversion circuitry 2 and a command generator 3.

Power conversion circuitry 2 includes a plurality of leg circuits 4u, 4v, 4w (where mentioned non-specifically, they are referred to as leg circuit 4) connected in parallel with each other between a positive DC terminal (i.e., high-potential-side DC terminal) Np and a negative DC terminal (i.e., low-potential-side DC terminal) Nn.

Leg circuit 4 is provided for each of a plurality of phases of AC. Leg circuit 4 is connected between AC circuit 12 and DC circuit 14 for performing power conversion between the AC circuit and the DC circuit. FIG. 1 shows AC circuit 12 of a three-phase AC system, and three leg circuits 4u, 4v, and 4w are arranged respectively for U phase, V phase, and W phase.

AC input terminals Nu, Nv, and Nw arranged respectively in leg circuits 4u, 4v, and 4w are connected to AC circuit 12 through an interconnection transformer 13. AC circuit 12 is an AC power system including an AC power source, for example. For the sake of simplifying illustration, connection between AC input terminals Nv, Nw and interconnection transformer 13 is not shown in FIG. 1.

High-potential-side DC terminal Np and low-potential-side DC terminal Nn connected commonly to leg circuits 4 are connected to DC circuit 14. DC circuit 14 is a DC terminal for a DC power system including a DC transmission network or the like, or a DC terminal for another power conversion device, for example. In the latter case, the two power conversion devices are coupled together to form a BTB (Back To Back) system for connecting AC power systems that are different from each other in the rated frequency, for example.

The leg circuits may be connected to AC circuit 12 through an interconnection reactor, instead of interconnection transformer 13 in FIG. 1. Further, instead of AC input terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, leg circuit 4 is connected electrically (DC or AC connection) to AC circuit 12 through respective connecting parts arranged in leg circuits 4u, 4v, 4w, such as AC input terminals Nu, Nv, Vw or the aforementioned primary windings.

Leg circuit 4u includes an upper arm 5 from high-potential-side DC terminal Np to AC input terminal Nu, and a lower arm 6 from low-potential-side DC terminal Nn to AC input terminal Nu. AC input terminal Nu which is a connecting point between upper arm 5 and lower arm 6 is connected to interconnection transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded submodules 7 and reactor 8A. These submodules 7 and reactor 8A are connected in series to each other.

Likewise, lower arm 6 includes a plurality of cascaded submodules 7 and reactor 8B. These submodules 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power conversion device is decreased. It is therefore preferable to turn off all switching devices in each submodule 7 as quickly as possible in the event of a fault.

Power conversion device 1 in FIG. 1 further includes, as detectors for measuring the amount of electricity (current, voltage, for example) to be used for control, an AC voltage detector 10, an AC current detector 16, DC voltage detectors 11A, 11B, and arm current detectors 9A, 9B disposed in each leg circuit 4.

Signals detected by these detectors are input to command generator 3. Based on these detected signals, command generator 3 outputs operation commands 15pu, 15nu, 15pv, 15nv, 15pw, 15nw for controlling the operating states of respective submodules 7. Command generator 3 also receives, from each submodule, a signal 17 representing a detected value of the cell capacitor voltage.

In the case of the present embodiment, operation commands 15pu, 15nu, 15pv, 15nv, 15pw, and 15nw are generated for the U phase upper arm, the U phase lower arm, the V phase upper arm, the V phase lower arm, the W phase upper arm, and the W phase lower arm, respectively. In the following description, where operation commands 15pu, 15nu, 15pv, 15nv, 15pw, 15nw are mentioned collectively or non-specifically, they are referred to as operation command 15.

For the sake of simplifying the illustration, FIG. 1 shows collectively some of signal lines for signals that are input from respective detectors to command generator 3 and signal lines for signals that are input or output between command generator 3 and respective submodules 7. Actually, however, the signal line is disposed individually for each detector and each submodule 7. The signal line between each submodule 7 and command generator 3 may be provided as separate transmission line and reception line. In the case of the present embodiment, these signals are transmitted through optical fibers for the sake of noise immunity.

In the following, each detector is described specifically. AC voltage detector 10 detects U phase AC voltage value Vacu, V phase AC voltage value Vacv, and W phase AC voltage value Vacw of AC circuit 12. AC current detector 16 detects U phase AC current value Iacu, V phase AC current value Iacv, and W phase AC current value Iacw of AC circuit 12. DC voltage detector 11A detects DC voltage value Vdcp of high-potential-side DC terminal Np connected to DC circuit 14. DC voltage detector 11B detects DC voltage value Vdcn of low-potential-side DC terminal Nn connected to DC circuit 14.

Arm current detectors 9A, 9B disposed in U phase leg circuit 4u detect upper arm current Ipu flowing in upper arm 5 and lower arm current Inu flowing in lower arm 6, respectively. Likewise, arm current detectors 9A, 9B disposed in V phase leg circuit 4v detect upper arm current Ipv and lower arm current Inv, respectively. Arm current detectors 9A, 9B disposed in W phase leg circuit 4w detect upper arm current Ipw and lower arm current Inw, respectively.

[Example Configuration of Submodule]

Figure 2:
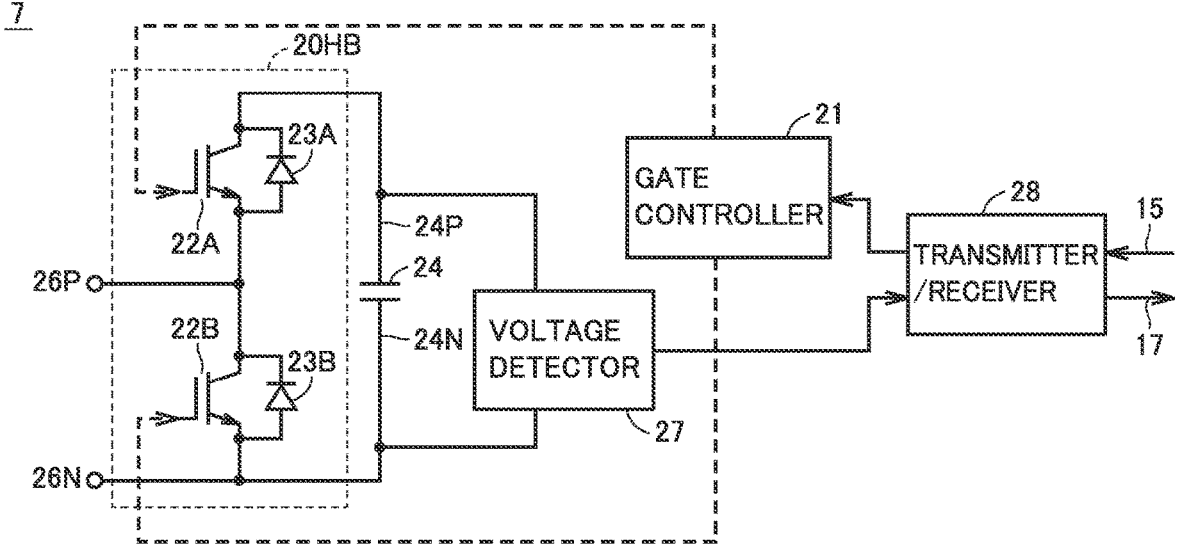
FIG. 2 is a circuit diagram showing an example of a submodule which is a component of each leg circuit in FIG. 1.

FIG. 2 is a circuit diagram showing an example of the submodule which is a component of each leg circuit in FIG. 1. Submodule 7 shown in FIG. 2 includes a half-bridge-type conversion circuit 20HB, a DC capacitor 24 serving as an energy storage, a gate controller 21, a voltage detector 27, and a transmitter/receiver 28.

Half-bridge-type conversion circuit 20HB includes switching devices 22A, 22B connected in series to each other, and diodes 23A, 23B. Diodes 23A, 23B are connected in anti-parallel (i.e., in parallel in the reverse-bias direction) with switching devices 22A, 22B, respectively. DC capacitor 24 is connected in parallel with the series-connected circuit made up of switching devices 22A, 22B for holding a DC voltage. A connection node between switching devices 22A and 22B is connected to a high-potential-side input/output terminal 26P. A connection node between switching devices 22B and DC capacitor 24 is connected to a low-potential-side input/output terminal 26N.

Gate controller 21 operates in accordance with operation command 15 received from command generator 3 in FIG. 1. During a normal operation (i.e., zero voltage or positive voltage is output between input/output terminals 26P and 26N), gate controller 21 performs control to cause one of switching devices 22A, 22B to be in the ON state and the other to be in the OFF state. While switching device 22A is in the ON state and switching device 22B is in the OFF state, a voltage across DC capacitor 24 is applied between input/output terminals 26P and 26N. On the contrary, while switching device 22A is in the OFF state and switching device 22B is in the ON state, the voltage between input/output terminals 26P and 26N is 0 V.

Thus, submodule 7 shown in FIG. 2 can cause switching devices 22A, 22B to become the ON state alternately to thereby output zero voltage or a positive voltage depending on the voltage of DC capacitor 24. Diodes 23A, 23B are provided for the sake of protection when a reverse-direction voltage is applied to switching devices 22A, 22B.

In contrast, when command generator 3 in FIG. 1 detects that the arm current is overcurrent, gate controller 21 turns off both switching devices 22A, 22B for the sake of circuit protection. Accordingly, in the event of a ground fault of DC circuit 14, for example, fault current flows through diode 23B.

Voltage detector 27 detects the voltage between opposite terminals 24P and 24N of DC capacitor 24. In the following description, the voltage of DC capacitor 24 is also referred to as cell capacitor voltage. Transmitter/receiver 28 transmits, to gate controller 21, operation command 15 received from command generator 3 in FIG. 1, and transmits, to command generator 3, a signal 17 representing the cell capacitor voltage detected by voltage detector 27.

Above-described gate controller 21, voltage detector 27, and transmitter/receiver 28 may be configured in the form of a dedicated circuit, or configured in the form of an FPGA (Field Programmable Gate Array), or the like.

As each of switching devices 22A, 22B, a self-arc-extinguishing-type switching device is used, of which ON operation and OFF operation can both be controlled. Switching devices 22A, 22B are each an IGBT (Insulated Gate Bipolar Transistor) or GCT (Gate Commutated Turn-off thyristor), for example.

The above-described configuration of submodule 7 is given as an example, and submodule 7 having a different configuration is also applicable to the present embodiment. For example, submodule 7 may be configured in the form of a full-bridge-type conversion circuit, or a three-quarter-bridge-type conversion circuit.

[Configuration of Command Generator]

Figure 3:
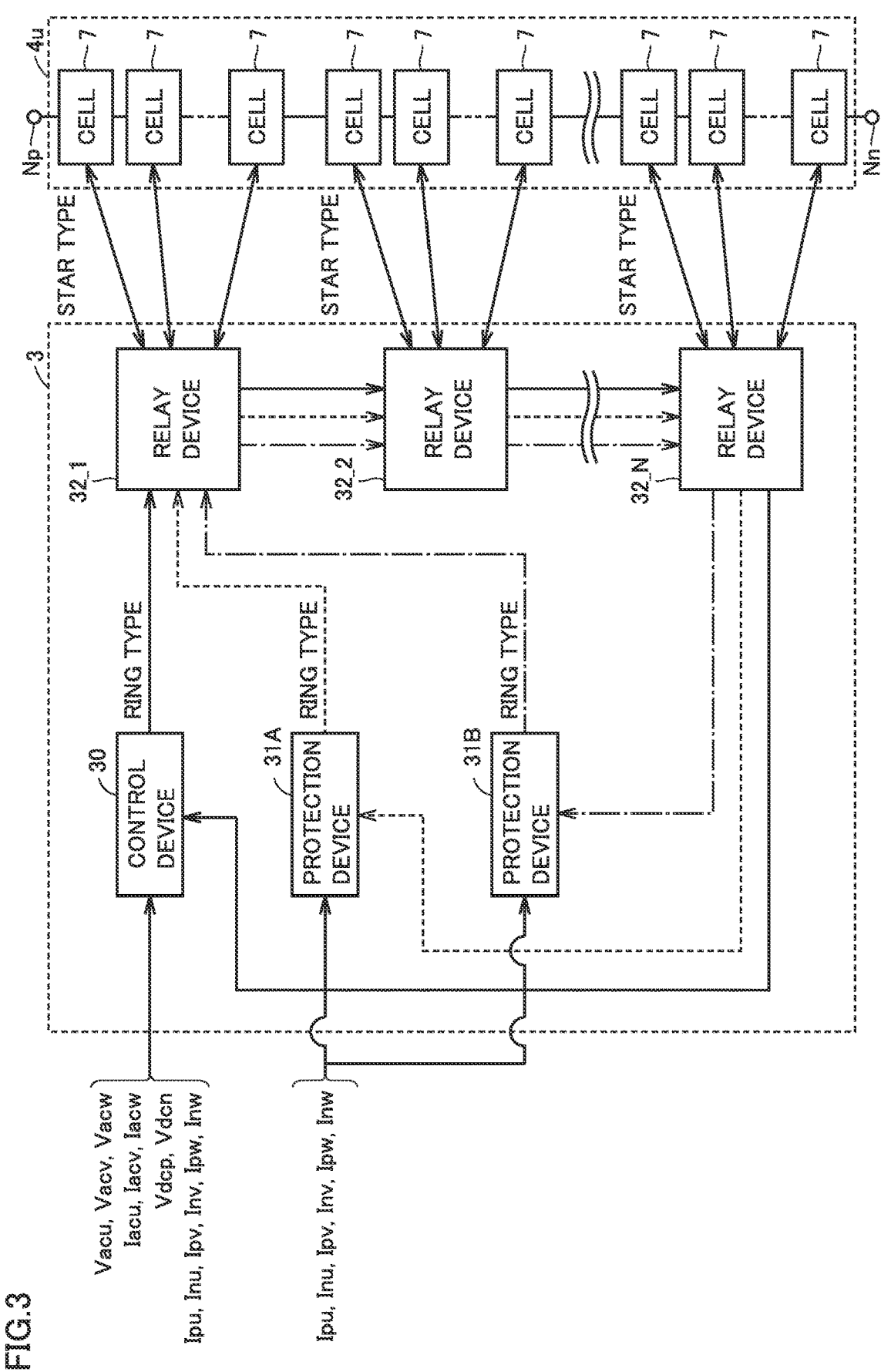
FIG. 3 is a block diagram showing a specific configuration of a command generator according to Embodiment 1.

FIG. 3 is a block diagram showing a specific configuration of the command generator according to Embodiment 1. Referring to FIG. 3, command generator 3 includes a control device 30, protection devices 31A, 31B, and a plurality of relay devices 32_1 to 32_N. While FIG. 3 shows only U phase leg circuit 4u in power conversion circuitry 2 in FIG. 1 as a representative leg circuit, the configuration in FIG. 3 applies as well to other leg circuits 4v, 4w. Where protection devices 31A, 31B are mentioned collectively or non-specifically, they are referred to as protection device 31. Where relay devices 32_1 to 32_N are mentioned collectively or non-specifically, they are referred to as relay device 32.

In power conversion device 1, control device 30 and protection device 31 control operation of a large number of (on the order of 2000, for example) submodules 7. Typically, the number of communication cables connectable directly to control device 30 and protection device 31 is limited.

Therefore, it is often difficult to directly connect each of control device 30 and protection device 31 to all submodules 7. Moreover, even when each of control device 30 and protection device 31 can be connected to all submodules 7, an enormously large number of communication cables are used for connecting them, which increases the cost.

In view of the above, in power conversion device 1 according to the present embodiment, a plurality of relay devices 32 are arranged between control device 30 and each submodule 7 and between protection device 31 and each submodule 7. Each of control device 30 and protection device 31 is connected to a plurality of relay devices 32 through a ring-type network. Each relay device 32 is star-connected to a predetermined number of submodules 7. Each relay device 32 is star-connected to a plurality of submodules 7 which form a single arm, for example. In this way, the ring-type network topology is combined with the star-type network topology to thereby form a network between control device 30 and protection device 31 and each submodule 7.

Based on AC voltage values Vacu, Vacv, Vacw (where mentioned collectively, they are referred to as AC voltage value Vac), AC current values Iacu, Iacv, Iacw (where mentioned collectively, they are referred to as AC current value Iac), DC voltage values Vdcp, Vdcn (where mentioned collectively, they are referred to as DC voltage value Vdc), upper arm currents Ipu, Ipv, Ipw, lower arm currents Inu, Inv, Inw, and cell capacitor voltage Vcap that are detected by respective detectors in FIG. 1, control device 30 generates a control command for controlling operation of each submodule 7 during a normal operation, and transmits the generated control command to each relay device 32. The control command includes a voltage command (an output voltage command value for upper arm 5 and an output voltage command value for lower arm 6 in each leg circuit 4u, 4v, 4w, for example), and a synchronization command for synchronizing respective operations of submodules 7.

Cell capacitor voltage Vcap is an average of voltage values of DC capacitors 24 detected in respective submodules 7 that is determined by relay device 32 for each arm circuit. A more specific example configuration of control device 30 is described with reference to FIG. 4.

Protection device 31 generates a protection command for protecting each submodule 7. Specifically, protection device 31 determines whether or not at least one of upper arm currents Ipu, Ipv, Ipw flowing in respective upper arms 5 of leg circuits 4u, 4v, 4w, and lower arm currents Inu, Inv, Inw flowing in respective lower arms 6 thereof is higher than a threshold value, i.e., whether or not overcurrent flows in at least one of the arms.

When at least one of the arm currents is higher than the threshold value, protection device 31 generates a protection command including a stop command for stopping operation of each submodule 7, and transmits the protection command to each relay device 32. In contrast, when all the arm currents are less than the threshold value, protection device 31 may not generate the protection command, or may generate a protection command including a normal operation command for causing each submodule 7 to operate based on the control command.

Relay device 32 receives the control command from control device 30 and receives the protection command from protection device 31. Relay device 32 outputs, to each submodule 7, operation command 15 including at least one of the control command and the protection command. In the case of the present embodiment, the control command included in operation command 15 is configured for each upper arm 5 and for each lower arm 6, while the protection command is common to submodules 7.

As described above with reference to FIGS. 1 and 2, each submodule 7 operates in accordance with operation command 15. A more detailed example configuration of relay device 32 is described with reference to FIG. 5.

Control device 30 transmits the control command to relay device 32 at a predetermined period T1 (an electrical angle of 1.875°, for example). If the system frequency is 60 Hz, the electrical angle 1.875° corresponds to 86.8 microseconds. Control device 30 requires a certain time for calculating the command value for the arm voltage. Therefore, when control device 30 transmits the control command at period T1, protection device 31 transmits the protection command at a period T2 (several microseconds, for example) shorter than period T1.

Relay device 32 transmits operation command 15 to each submodule 7 at a period T3 (several microseconds, for example) shorter than period T1.

The control command, protection command, and operation command 15 may be transmitted through an optical fiber in order to increase the noise immunity. Moreover, control device 30, protection device 31, and relay device 32 may be configured in the form of a dedicated circuit, or partially or entirely in the form of an FPGA (Field Programmable Gate Array) and/or a microprocessor. Control device 30 and protection device 31 may be configured in the form of a digital protection relay device, for example.

[Example Configuration of Control Device]

Figure 4:
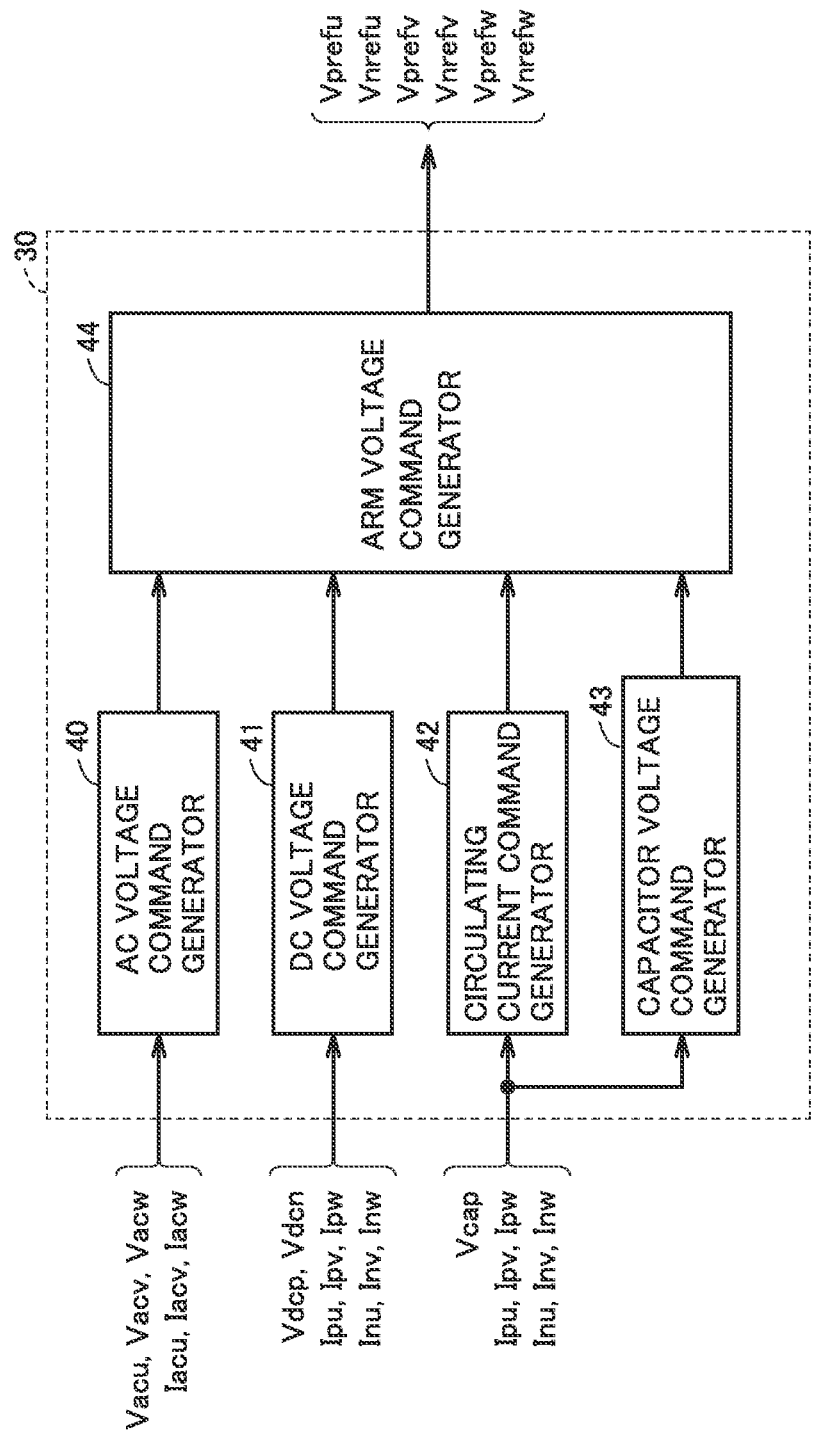
FIG. 4 is a block diagram showing an example configuration of a control device according to Embodiment 1.

FIG. 4 is a block diagram showing an example configuration of control device 30 according to Embodiment 1. Referring to FIG. 4, control device 30 includes an AC voltage command generator 40, a DC voltage command generator 41, a circulating current command generator 42, a capacitor voltage command generator 43, and an arm voltage command generator 44.

AC voltage command generator 40 generates an AC voltage command value for each phase, based on U phase, V phase, and W phase AC voltage values Vacu, Vacv, and Vacw detected by AC voltage detector 10, and U phase, V phase, and W phase AC current values Iacu, Iacv, and Iacw detected by AC current detector 16. AC voltage command generator 40 is configured in the form of a feedback controller such as PID controller (Proportional-Integral-Differential controller), for example.

DC voltage command generator 41 calculates DC current value Idc based on upper arm currents Ipu, Ipv, Ipw and lower arm currents Inu, Inv, Inw of respective phases. Specifically, DC current value Idc can be calculated by the following expression (1), where Idc_p is the sum of upper arm currents Ipu, Ipv, Ipw, and Idc_n is the sum of lower arm currents Inu, Inv, Inw.

$$Idc=(Idc\_p+Idc\_n)/2 \qquad (1)$$

DC voltage command generator 41 generates the DC voltage command value based on DC voltage values Vdcp, Vdcn detected by DC voltage detectors 11A, 11B, and the calculated DC current value Idc. DC voltage command generator 41 is configured in the form of a feedback controller such as PID controller, for example.

Circulating current command generator 42 first calculates circulating currents Iccu, Iccv, Iccw flowing in respective leg circuits 4u, 4v, 4w, based on upper arm currents Ipu, Ipv, Ipw and lower arm currents Inu, Inv, Inw of respective phases. The circulating current is current circulating through a plurality of leg circuits 4. For example, circulating current Iccu flowing in U phase leg circuit 4*u* can be calculated by the following expression (2).

$$Iccu=(Ipu+Inu)/2-Idc/3 \quad (2)$$

The first term in the above expression (2) represents current flowing commonly in upper arm 5 and lower arm 6 of leg circuit 4*u*. The second term in the above expression (2) represents a corresponding portion of DC current flowing in U phase leg circuit 4*u*, supposing that DC current value Idc flows equally in each of the leg circuits. Circulating currents Iccv, Iccw can be calculated similarly to circulating current Iccu.

Circulating current command generator 42 calculates a command value for the circulating current of each phase, based on the calculated circulating currents Iccu, Iccv, Iccw for respective phases and cell capacitor voltage Vcap which is an average for each arm circuit. Circulating current command generator 42 is configured in the form of a feedback controller such as PID controller, for example.

Capacitor voltage command generator 43 generates a voltage command value for the DC capacitor of each submodule 7, based on cell capacitor voltage Vcap which is an average for each arm circuit, and upper arm currents Ipu, Ipv, Ipw and lower arm currents Inu, Inv, Inw of respective phases. Capacitor voltage command generator 43 is configured in the form of a feedback controller such as PID controller, for example.

Arm voltage command generator 44 generates arm voltage command values Vprefu, Vnrefu, Vprefv, Vnrefv, Vprefw, Vnrefw for upper arm 5 and lower arm 6 of each phase. Arm voltage command values Vprefu, Vnrefu, Vprefv, Vnrefv, Vprefw, Vnrefw for respective phases are transmitted as control commands (voltage commands) to relay device 32. In the following description, arm voltage command values may be referred to simply as arm voltage command values Vpref, Vnref where a particular phase is not specified.

The above-described configuration of control device 30 is given as an example, and a control device having a different configuration is also applicable to the present embodiment.

[Configuration and Operation of Relay Device]

Figure 5:
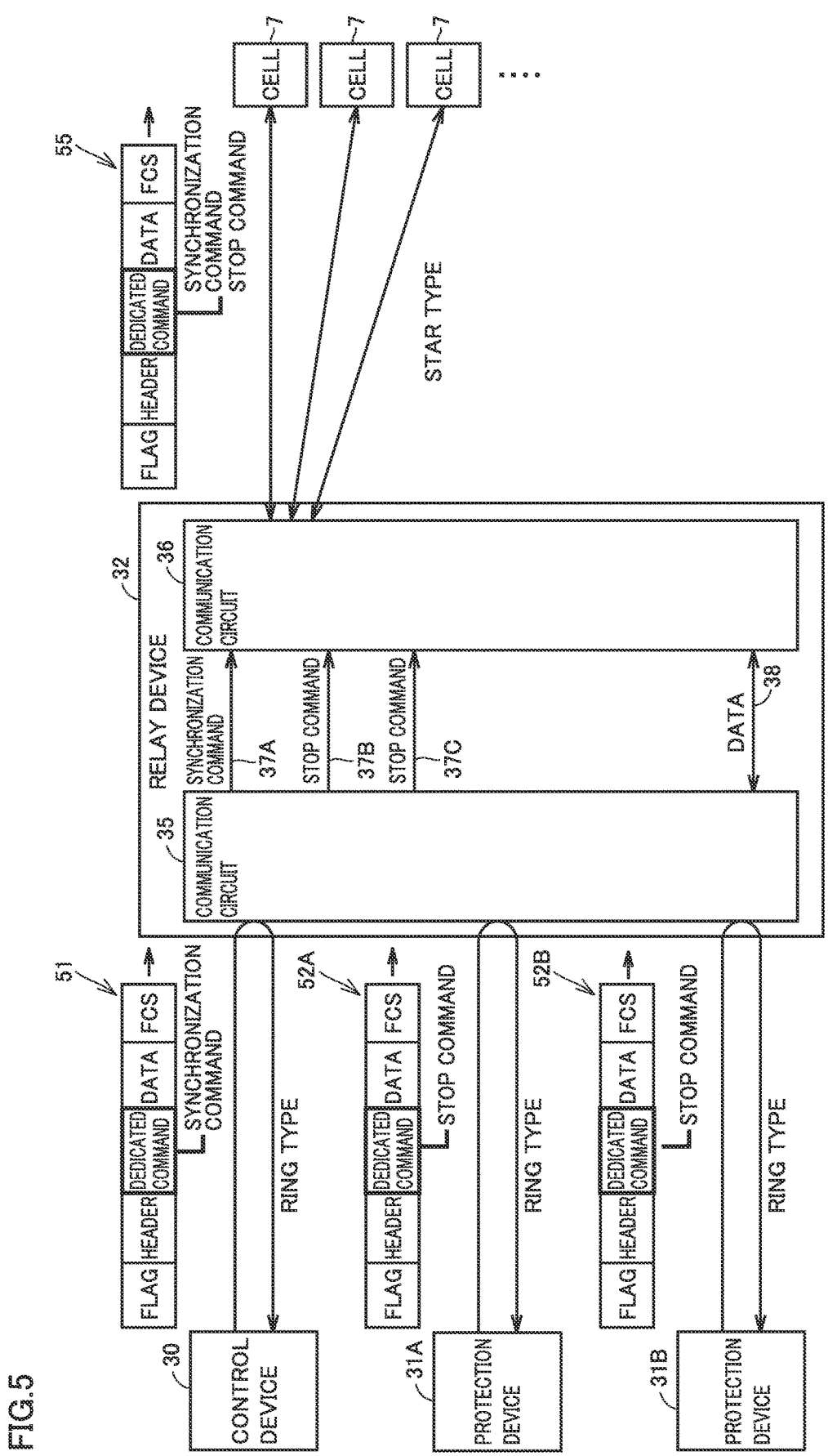
FIG. 5 illustrates a configuration and an operation of a relay device according to Embodiment 1.

FIG. 5 illustrates a configuration and an operation of relay device 32 according to Embodiment 1. Referring to FIG. 5, relay device 32 includes a communication circuit 35 for communicating with control device 30 and protection device 31, a communication circuit 36 for communicating with each submodule 7, dedicated communication channels 37A, 37B, 37C, and a data communication channel 38. Where dedicated communication channels 37A, 37B, 37C are mentioned collectively or non-specifically, they are referred to as dedicated communication channel 37.

Communication circuit 35 transmits and receives a communication frame 51 to and from control device 30 through a ring-type network. Communication circuit 35 also transmits and receives a communication frame 52A to and from protection device 31A through a ring-type network, and transmits and receives a communication frame 52B to and from protection device 31B through a ring-type network. Where communication frames 52A, 52B are mentioned collectively or non-specifically, they are referred to as communication frame 52. Communication circuit 36 transmits a communication frame 55 to each submodule 7 through a star-type network. Communication frames 51, 52, 55 have a configuration as shown in FIG. 6.

Figure 6:
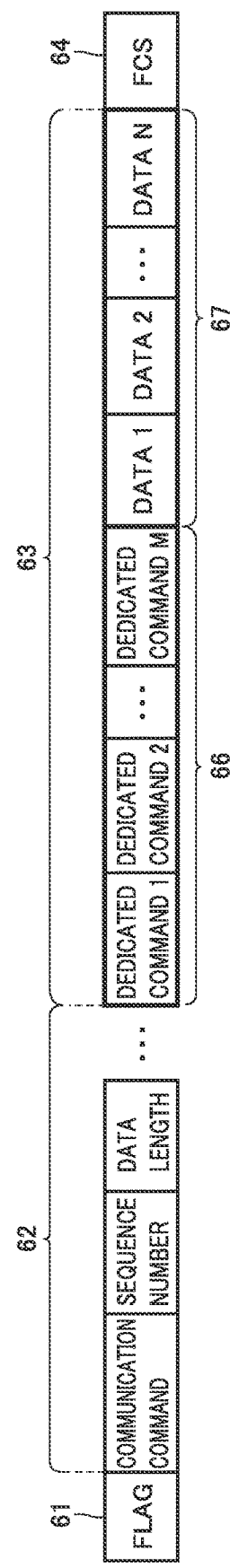
FIG. 6 schematically shows a communication frame configuration according to Embodiment 1.

FIG. 6 schematically shows a communication frame configuration according to Embodiment 1. Referring to FIG. 6, a communication frame includes a flag region 61, a header region 62, a payload region 63 in which substantial data is stored, and an FCS (Frame Check Sequence) region 64 in which error detection information is stored. In header region 62, information such as communication command, sequence number, and data length is stored. Payload region 63 includes a dedicated command field 66 and a data field 67.

Referring to FIGS. 5 and 6, in payload region 63 of communication frame 51 which is transmitted and received between control device 30 and relay device 32, a control command and a control result are stored. Specifically, in dedicated command field 66 of communication frame 51, a synchronization command which is included in the control command is stored and, in data field 67 thereof, a different command which is included in the control command besides the synchronization command is stored. The different command includes a voltage command (output voltage command value for upper arm 5 of each leg circuit 4*u*, 4*v*, 4*w*, and output voltage command value for lower arm 6 thereof, for example). The control result is cell capacitor voltage Vcap, for example.

In payload region 63 of communication frame 52 transmitted from protection device 31, data of a protection command is stored. Specifically, in dedicated command field 66 of communication frame 52, a stop command which is included in the protection command is stored and, in data field 67 thereof, a different command which is included in the protection command as well as submodule state information are stored. The different protection command may include a normal operation command, for example. The state information may include operating state, stopping state, and failure information regarding a submodule, for example. No data may be stored in data field 67 of communication frame 52. In this case, the protection command is substantially identical to the stop command.

Communication circuit 35 extracts the synchronization command from dedicated command field 66 of communication frame 51 received from control device 30, and transmits the synchronization command to communication circuit 36 through dedicated communication channel 37A. The synchronization command is converted into a dedicated signal and transmitted from communication circuit 35 to communication circuit 36. Communication circuit 35 also extracts a voltage command from data field 67 of communication frame 51, and stores the voltage command in an internal memory. Communication circuit 35 reads the voltage command stored in the internal memory and transmits the voltage command to communication circuit 36 through data communication channel 38 at a predetermined period T4.

Communication circuit 35 extracts the stop command from dedicated command field 66 of communication frame 52A received from protection device 31A, and transmits the stop command to communication circuit 36 through dedicated communication channel 37B. The stop command is converted into a dedicated signal and transmitted from communication circuit 35 to communication circuit 36. Communication circuit 35 also extracts a different command from data field 67 of communication frame 52, and stores the different command in an internal memory. Communication circuit 35 reads the different command stored in the internal memory and transmits the different command to communication circuit 36 through data communication channel 38 at predetermined period T4. Communication circuit 35 extracts the stop command from communication frame 52B received from protection device 31B, and transmits the stop command to communication circuit 36 through dedicated communication channel 37C.

As described above, the voltage command and the different command which is included in the protection command are stored temporarily in the internal memory, and transmitted through data communication channel 38 at period T4. In contrast, the synchronization command and the stop command are transmitted immediately after extracted from the communication frame (i.e., regardless of period T4) through dedicated communication channel 37, without being stored in the internal memory.

Therefore, when communication circuit 35 receives communication frame 51, the synchronization command which is transmitted through dedicated communication channel 37A reaches communication circuit 36 earlier than the voltage command which is transmitted through data communication channel 38. Specifically, the communication speed between communication circuit 35 and communication circuit 36 through dedicated communication channel 37 is higher than the communication speed between communication circuit 35 and communication circuit 36 through data communication channel 38. In other words, the communication method using dedicated communication channel 37 is a communication method with a higher communication speed than the communication method using data communication channel 38.

Communication circuit 36 receives, through dedicated communication channel 37, a dedicated signal corresponding to the synchronization command and a dedicated signal corresponding to the stop command, and stores them in an internal memory. Communication circuit 36 receives, through data communication channel 38, a voltage command and a different command (normal operation command, for example), and stores them in the internal memory.

Communication circuit 36 transmits communication frame 55 containing operation command 15 to each submodule 7 at period T3. Specifically, in payload region 63 of communication frame 55 transmitted from communication circuit 36, operation command 15 is stored. More specifically, in dedicated command field 66 of communication frame 55, the synchronization command and the stop command are stored and, in data field 67 thereof, the voltage command and the different command which is included in the protection command are stored.

Communication circuit 36 stores, in a corresponding region(s) of communication frame 55, the latest information (specifically at least one of synchronization command, stop command, voltage command, and different command) stored in the internal memory, as described above, and transmits this communication frame 55 to each submodule 7 at period T3.

Accordingly, the configuration in which the stop command and the synchronization command are transmitted through dedicated communication channel 37 can achieve a significantly shortened time taken for the stop command from protection device 31 to reach each submodule 7, and a significantly shortened time taken for the synchronization command from control device 30 to reach each submodule 7, as compared with the configuration in which these commands are transmitted through data communication channel 38 instead of dedicated communication channel 37.

Communication circuit 36 also receives, from each submodule 7, signal 17 representing a detected value of the cell capacitor voltage. For example, communication circuit 36 calculates cell capacitor voltage Vcap by averaging respective voltages (i.e., signals 17) of DC capacitors 24 detected by voltage detectors 27 of respective submodules 7 for each arm circuit. Cell capacitor voltage Vcap is stored in the internal memory.

Communication circuit 36 reads cell capacitor voltage Vcap and transmits it to communication circuit 35 through data communication channel 38 at period T4. Communication circuit 35 stores cell capacitor voltage Vcap in data field 67 of communication frame 51, and transmits this communication frame 51 to control device 30. Cell capacitor voltage Vcap is used as a control result for generating a control command by control device 30.

<Advantages>

Embodiment 1 enables each submodule 7 to stop operating more quickly upon detection of overcurrent due to a fault in an electric power system, for example, and enables each submodule 7 to be protected appropriately. Moreover, as to the function of controlling each submodule 7, the synchronization signal generated by control device 30 can be transmitted speedily to each submodule 7, and therefore, quick control response can be accomplished.

Embodiment 2

As described above with reference to FIG. 5, control device 30 is connected to relay devices 32 through a ring-type network. In the case of the ring-type network, communication frame 51 is transmitted through a plurality of relay devices 32. As such, there is a difference between the time when communication frame 51 from control device 30 arrives at one relay device 32 and the time when communication frame 51 from control device 30 arrives at another relay device 32. In other words, the arrival time of the synchronization command contained in communication frame 51 is different among relay devices 32.

Relay device 32 is star-connected to submodules 7 (one-to-one connection). As such, where communication cables from relay device 32 to respective submodules 7 are identical in length from each other, there is no difference between submodules 7 in the arrival time of communication frame 55 transmitted from relay device 32. Thus, the difference in arrival time of the synchronization command between relay devices 32 is reflected on a deviation of the synchronization timing (jitter) between submodules 7. In view of the above, Embodiment 2 is described in connection with a configuration for reducing the difference in arrival time of the synchronization command between relay devices 32.

FIG. 7 illustrates a communication method and its advantages according to Embodiment 2. Specifically, FIG. 7 (a) illustrates a communication method according to a comparative example. FIG. 7 (b) illustrates a communication method according to Embodiment 2.

Referring to FIG. 7 (a), the communication method according to the comparative example is a method for communicating the voltage command, the synchronization command, and the control result in the same communication frame. Specifically, in the payload region of the communication frame, the voltage command, the synchronization command, and the control result are stored. The configuration of this communication frame is substantially identical to the configuration of communication frame 51 described above in connection with Embodiment 1.

In this case, a communication frame 81 transmitted from control device 30 first arrives at relay device 32_1 (corresponding to relay device (1) in FIG. 7). Then, communication frame 81 is transmitted from relay device 32_1 to relay device 32_2. Subsequently, communication frame 81 is transmitted through a plurality of relay devices 32 to eventually reach relay device 32_N, and then transmitted from relay device 32_N to control device 30. The difference in arrival time of the communication frame between the first relay device 32_1 at which the communication frame transmitted from control device 30 arrives first, and the last relay device 32_N at which the communication frame arrives last, is Ta.

Referring to FIG. 7 (b), the communication method according to Embodiment 2 is a method for communicating the voltage command, the synchronization command, and the control result in respective communication frames different from each other. According to the communication method in Embodiment 2, control device 30 transmits a communication frame 91 containing the voltage command, a communication frame 93 containing the synchronization command, and a communication frame 95 containing the control result, to each relay device 32.

Specifically, communication frame 91 dedicated to voltage command is transmitted first from control device 30 to relay devices 32_1 to 32_N, and transmitted from relay device 32_N to control device 30. Communication frame 91 includes a flag region, a header region, a payload region, and an FCS region. In the data field (see FIG. 6) of the payload region in communication frame 91, the voltage command is stored by control device 30. The synchronization command is not stored in the payload region of communication frame 91. Therefore, the payload region may have the data field only and may not have the dedicated command field. Alternatively, the payload region may have a dedicated command field in which an invalid value is stored.

Next, communication frame 93 dedicated to synchronization command is transmitted from control device 30 to relay devices 32_1 to 32_N, and transmitted from relay device 32_N to control device 30. Communication frame 93 includes a flag region, a header region, a payload region, and an FCS region. In the dedicated command field of the payload region, the synchronization command is stored by control device 30. The voltage command and control result are not stored in the payload region of communication frame 93. Therefore, the payload region may have the dedicated command field only and may not have the data field.

The difference in arrival time of communication frame 93 between relay device 32_1 and relay device 32_N is Tb which is shorter than arrival time difference Ta. This is for the reason that communication frame 93 in which only the synchronization command is stored in the payload region is shorter in communication frame length than communication frame 81 in which the voltage command, synchronization command, and control result are stored in the payload region. Thus, the difference in arrival time of the synchronization command between relay devices 32 can be reduced, and accordingly, the jitter which is a deviation of the synchronization timing among submodules 7 can be reduced.

Finally, communication frame 95 dedicated to the control result is transmitted from control device 30 to relay devices 32_1 to 32_N, and transmitted from relay device 32_N to control device 30. Communication frame 95 includes a flag region, a header region, a payload region, and an FCS region. In the data field of the payload region of communication frame 95, the control result is stored by control device 30. The synchronization command is not stored in the payload region of communication frame 95. Therefore, the payload region may have the dedicated command field only and may not have the data field. Alternatively, the payload region may have a dedicated command field in which an invalid value is stored.

According to the configuration described above, control device 30 transmits communication frames 91, 93, and 95 in this order. Embodiments, however, are not limited to this configuration. Specifically, the configuration may be any as long as control device 30 transmits communication frame 91 to relay devices 32 and thereafter transmits communication frame 93 to relay devices 32. For example, control device 30 may transmit communication frames in the order of communication frames 95, 91, and 93, or in the order of communication frames 91, 95, and 93.

Alternatively, control device 30 may transmit a communication frame in which the voltage command and the control result are stored in the payload region, and communication frame 93 in which the synchronization command is stored in the payload region. In this case, control device 30 transmits these frames in the order of the communication frame in which the voltage command and the control result are stored, and communication frame 93.

<Advantages>

Embodiment 2 enables the time taken for the synchronization command to reach each submodule 7 to be shortened as much as possible, even when control device 30 and relay devices 32 are connected through a ring-type network. Accordingly, the difference in arrival time of the synchronization command between submodules 7 can be reduced, and the jitter of the synchronization timing can be reduced.

Other Embodiments

According to the embodiments described above, power conversion device 1 includes a plurality of relay devices 32. The embodiments, however, are not limited to this configuration. For example, power conversion device 1 may include a single relay device 32. In this case, each of control device 30 and protection device 31 is connected to relay device 32 through a point-to-point type network.

According to the embodiments described above, N relay devices 32_1 to 32_N for U phase are connected through a single ring-type communication line as shown in FIG. 3. The embodiments, however, are not limited to this configuration, and N relay devices may be connected through a plurality of communication lines. For example, the number of relay devices connected through a single ring-type communication line may be set to four at the maximum. Then, eight relay devices are connected by connecting four relay devices through a first ring-type communication line and connecting the remaining four relay devices through a second ring-type communication line.

According to the embodiments described above, protection device 31 transmits the protection command including the stop command to each relay device 32, when protection device 31 determines that overcurrent flows in at least one arm. The embodiments, however, are not limited to this configuration. For example, protection device 31 may transmit the protection command to each relay device 32 upon detecting an abnormality of the electric power system other than overcurrent (the abnormality may be overvoltage, undervoltage, abnormal frequency, for example).

The configuration illustrated above by way of example in connection with each of above-described embodiments is an example configuration of the present embodiment, and can be combined with another known technique, or the configuration can be modified by being omitted partially, for example, without going beyond the scope of the present invention.

Moreover, each embodiment described above may be implemented by appropriately introducing, into the embodiment, a process(es) and/or a configuration(s) described above in connection with other embodiments.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 power conversion device; 2 power conversion circuitry; 3 command generator; 4u, 4v, 4w leg circuit; 5 upper arm; 6 lower arm; 7 submodule; 8A, 8B reactor; 9A, 9B arm current detector; 10 AC voltage detector; 11A, 11B DC voltage detector; 12 AC circuit; 13 interconnection transformer; 14 DC circuit; 15nu, 15nv, 15nw, 15pu, 15pv, 15pw operation command; 16 AC current detector; 17 signal; 20HB conversion circuit; 21 gate controller; 22A, 22B switching device; 23A, 23B diode; 24 DC capacitor; 26N, 26P input/output terminal; 27 voltage detector; 28 transmitter/receiver; 30 control device; 31A, 31B protection device; 32 relay device; 35, 36 communication circuit; 37A, 37B, 37C dedicated communication channel; 38 data communication channel; 40 AC voltage command generator; 41 DC voltage command generator; 42 circulating current command generator; 43 capacitor voltage command generator; 44 arm voltage command generator; 51, 52A, 52B, 55, 81, 91, 93, 95 communication frame; 61 flag region; 62 header region; 63 payload region; 64 FCS region; 66 dedicated command field; 67 data field.

The invention claimed is:

1. A power conversion device performing power conversion between a DC circuit and an AC circuit, the power conversion device comprising:
   power conversion circuitry including a plurality of submodules connected in series to each other;
   a protection device configured to generate a protection command for protecting each of the submodules; and
   a plurality of relay devices configured to output the protection command to each of the submodules,
   the protection command including a stop command for stopping operation of each of the submodules,
   the relay devices each including:
      a first communication circuit configured to communicate with the protection device; and
      a second communication circuit configured to communicate with the power conversion circuitry,
      the first communication circuit being configured to transmit the stop command to the second communication circuit through a first communication channel, and transmit different information different from the stop command to the second communication circuit through a second communication channel,
   a communication speed of communication between the first communication circuit and the second communication circuit through the first communication channel being higher than a communication speed of communication between the first communication circuit and the second communication circuit through the second communication channel,
   the second communication circuit being configured to transmit a communication frame to each of the submodules at a predetermined period, the communication frame containing the stop command and the different information received from the first communication circuit.

2. The power conversion device according to claim 1, further comprising a control device configured to generate a control command for controlling operation of each of the submodules, wherein
   the control command includes a synchronization command for synchronizing respective operations of the submodules,
   the relay devices are configured to output the control command to each of the submodules, and
   the first communication circuit is configured to transmit the synchronization command to the second communication circuit through the first communication channel.

3. The power conversion device according to claim 2, wherein each of the control device and the protection device is connected to the relay devices through a ring-type network.

4. The power conversion device according to claim 3, wherein
   the control device is configured to transmit, to the relay devices,
      a first communication frame containing a different command which is included in the control command besides the synchronization command, and
      a second communication frame containing the synchronization command which is included in the control command.

5. The power conversion device according to claim 4, wherein
   the power conversion circuitry includes:
      a high-potential-side DC terminal and a low-potential-side DC terminal that are connected to the DC circuit; and
      a plurality of leg circuits corresponding to respective phases of the AC circuit and connected in parallel with each other between the high-potential-side DC terminal and the low-potential-side DC terminal,
   the plurality of leg circuits each include:
      a connecting part connected electrically to a corresponding phase of the AC circuit;
      an upper arm including multiple submodules among the plurality of submodules, the multiple submodules being connected in series to each other between the connecting part and the high-potential-side DC terminal; and
      a lower arm including multiple submodules among the plurality of submodules, the multiple submodules being connected in series to each other between the connecting part and the low-potential-side DC terminal, and
   the different command includes an output voltage command value for the upper arm, and an output voltage command value for the lower arm.

6. The power conversion device according to claim 5, wherein the control device is configured to transmit the first communication frame to the relay devices and thereafter transmit the second communication frame to the relay devices.

7. The power conversion device according to claim 3, wherein the relay devices are each connected through a star-type network to a predetermined number of submodules among the plurality of submodules.

8. The power conversion device according to claim 2, wherein the relay devices are each connected through a star-type network to a predetermined number of submodules among the plurality of submodules.

9. The power conversion device according to claim 1, wherein the relay devices are each connected through a star-type network to a predetermined number of submodules among the plurality of submodules.

10. A power conversion device performing power conversion between a DC circuit and an AC circuit, the power conversion device comprising:
   power conversion circuitry including a plurality of submodules connected in series to each other;
   a control device configured to generate a control command for controlling operation of each of the submodules;
   a protection device configured to generate a protection command for protecting each of the submodules; and
   a plurality of relay devices configured to output the protection command and the control command to each of the submodules,
   the protection command including a stop command for stopping operation of each of the submodules,
   the control command including a synchronization command for synchronizing respective operations of the submodules,
   the control device being connected to the plurality of relay devices through a ring-type network,
   the relay devices being each connected to a predetermined number of submodules among the plurality of submodules through a star-type network,
   the control device being configured to transmit, to the plurality of relay devices,
      a first communication frame containing a different command which is included in the control command besides the synchronization command, and
      a second communication frame containing the synchronization command which is included in the control command,
   the relay devices each being configured to transmit a communication frame to each of the submodules at a predetermined period, the communication frame containing the stop command and the control command.

11. A communication method used for a power conversion device performing power conversion between a DC circuit and an AC circuit,
   the power conversion device comprising:
      power conversion circuitry including a plurality of submodules connected in series to each other;
      a protection device configured to generate a protection command for protecting each of the submodules; and
      a plurality of relay devices configured to output the protection command to each of the submodules,
   the protection command including a stop command for stopping operation of each of the submodules,
   the relay devices each including:
      a first communication circuit configured to communicate with the protection device; and
      a second communication circuit configured to communicate with the power conversion circuitry,
   the communication method comprising:
   transmitting, by the first communication circuit, the stop command to the second communication circuit through a first communication channel;
   transmitting, by the first communication circuit, different information different from the stop command to the second communication circuit through a second communication channel,
   a communication speed of communication between the first communication circuit and the second communication circuit through the first communication channel being higher than a communication speed of communication between the first communication circuit and the second communication circuit through the second communication channel; and
   transmitting, by the second communication circuit, a communication frame to each of the submodules at a predetermined period, the communication frame containing the stop command and the different information received from the first communication circuit.

* * * * *